United States Patent
Powell et al.

(10) Patent No.: US 9,536,108 B2
(45) Date of Patent: Jan. 3, 2017

(54) METHOD AND APPARATUS FOR GENERATING PRIVACY PROFILES

(71) Applicants: Travis Spence Powell, San Francisco, CA (US); Nadav Caspi, San Francisco, CA (US); Robert I. Wenig, San Francisco, CA (US); Wolf Herda, San Francisco, CA (US); Gerard Dietrich, San Francisco, CA (US)

(72) Inventors: Travis Spence Powell, San Francisco, CA (US); Nadav Caspi, San Francisco, CA (US); Robert I. Wenig, San Francisco, CA (US); Wolf Herda, San Francisco, CA (US); Gerard Dietrich, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 899 days.

(21) Appl. No.: 13/658,155

(22) Filed: Oct. 23, 2012

(65) Prior Publication Data
US 2014/0115712 A1 Apr. 24, 2014

(51) Int. Cl.
G06F 21/62 (2013.01)
H04L 29/06 (2006.01)

(52) U.S. Cl.
CPC ........... *G06F 21/6263* (2013.01); *H04L 63/10* (2013.01); *H04L 63/20* (2013.01); *G06F 2221/2117* (2013.01); *G06F 2221/2141* (2013.01)

(58) Field of Classification Search
CPC combination set(s) only.
See application file for complete search history.

(56) References Cited

U.S. PATENT DOCUMENTS

| | | | |
|---|---|---|---|
| 5,463,547 | A | 10/1995 | Markowitz |
| 5,564,043 | A | 10/1996 | Siefert |
| 5,577,254 | A | 11/1996 | Gilbert |
| 5,699,526 | A | 12/1997 | Siefert |
| 5,717,879 | A | 2/1998 | Moran et al. |

(Continued)

FOREIGN PATENT DOCUMENTS

| | | |
|---|---|---|
| CA | 2656539 | 2/2008 |
| CA | 2696884 | 3/2009 |

(Continued)

OTHER PUBLICATIONS

Communication from the EP Patent Office pursuant to Article 94(3) EPC in EP Application No. 09806979.2; dated Jan. 6, 2014.

(Continued)

*Primary Examiner* — Taghi Arani
*Assistant Examiner* — Phy Anh Vu
(74) *Attorney, Agent, or Firm* — Schwabe, Williamson & Wyatt, P.C.

(57) ABSTRACT

A privacy processing system may use privacy rules to filter sensitive personal information from web session data. The privacy processing system may generate privacy profiles or privacy metadata that identifies how often the privacy rules are called, how often the privacy rules successfully complete actions, and the processing time required to execute the privacy rules. The privacy profiles may be used to detect irregularities in the privacy filtering process that may be associated with a variety of privacy filtering and web session problems.

24 Claims, 11 Drawing Sheets

(56) References Cited

U.S. PATENT DOCUMENTS

| | | |
|---|---|---|
| 5,721,906 A | 2/1998 | Siefert |
| 5,751,962 A | 5/1998 | Fanshier et al. |
| 5,774,552 A | 6/1998 | Grimmer |
| 5,781,735 A | 7/1998 | Southard |
| 5,809,250 A | 9/1998 | Kisor |
| 5,825,880 A | 10/1998 | Sudia |
| 5,832,458 A | 11/1998 | Jones |
| 5,832,496 A | 11/1998 | Anand et al. |
| 5,845,124 A | 12/1998 | Berman |
| 5,848,396 A | 12/1998 | Gerace |
| 5,848,412 A | 12/1998 | Rowland |
| 5,857,188 A | 1/1999 | Douglas |
| 5,867,578 A | 2/1999 | Brickell |
| 5,870,559 A | 2/1999 | Leshem et al. |
| 5,894,516 A | 4/1999 | Brandenburg |
| 5,903,652 A | 5/1999 | Mital |
| 5,905,868 A | 5/1999 | Baghai et al. |
| 5,930,786 A | 7/1999 | Carino, Jr. et al. |
| 5,933,601 A | 8/1999 | Fanshier et al. |
| 5,941,957 A | 8/1999 | Ingrassia, Jr. et al. |
| 5,951,643 A | 9/1999 | Shelton et al. |
| 5,951,652 A | 9/1999 | Ingrassia, Jr. et al. |
| 5,954,798 A | 9/1999 | Shelton et al. |
| 5,991,791 A | 11/1999 | Siefert |
| 6,006,228 A | 12/1999 | McCollum et al. |
| 6,026,403 A | 2/2000 | Siefert |
| 6,035,332 A | 3/2000 | Ingrassia, Jr. et al. |
| 6,085,223 A | 7/2000 | Carino, Jr. et al. |
| 6,151,584 A | 11/2000 | Papierniak et al. |
| 6,151,601 A | 11/2000 | Papierniak et al. |
| 6,169,997 B1 | 1/2001 | Papierniak et al. |
| 6,182,097 B1 | 1/2001 | Hansen et al. |
| 6,253,203 B1 | 6/2001 | O'Flaherty et al. |
| 6,286,030 B1 | 9/2001 | Wenig |
| 6,286,046 B1 | 9/2001 | Bryant |
| 6,286,098 B1 | 9/2001 | Wenig |
| 6,295,550 B1 | 9/2001 | Choung et al. |
| 6,317,794 B1 | 11/2001 | Papierniak et al. |
| 6,334,110 B1 | 12/2001 | Walter et al. |
| 6,397,256 B1 | 5/2002 | Chan |
| 6,418,439 B1 | 7/2002 | Papierniak et al. |
| 6,480,855 B1 | 11/2002 | Siefert |
| 6,489,980 B1 | 12/2002 | Scott et al. |
| 6,502,096 B1 | 12/2002 | Siefert |
| 6,519,600 B1 | 2/2003 | Siefert |
| 6,651,072 B1 | 11/2003 | Carino, Jr. et al. |
| 6,658,453 B1 | 12/2003 | Dattatri |
| 6,671,687 B1 | 12/2003 | Pederson et al. |
| 6,714,931 B1 | 3/2004 | Papierniak et al. |
| 6,766,333 B1 | 7/2004 | Wu et al. |
| 6,850,975 B1 | 2/2005 | Danneels et al. |
| 6,877,007 B1 | 4/2005 | Hentzel et al. |
| 7,076,495 B2 | 7/2006 | Dutta et al. |
| 7,260,837 B2 | 8/2007 | Abraham et al. |
| 7,278,105 B1 | 10/2007 | Kitts |
| 7,293,281 B1 | 11/2007 | Moran et al. |
| 7,490,319 B2 | 2/2009 | Blackwell et al. |
| 7,580,996 B1 | 8/2009 | Allan |
| 7,627,648 B1 | 12/2009 | Mehta |
| RE41,903 E | 10/2010 | Wenig |
| 7,983,961 B1* | 7/2011 | Chang .................. G06Q 30/02 705/26.7 |
| 8,042,055 B2 | 10/2011 | Wenig |
| 8,127,000 B2 | 2/2012 | Wenig |
| 8,219,531 B2 | 7/2012 | Eagan et al. |
| 8,225,376 B2* | 7/2012 | Zuckerberg ........... H04L 67/306 715/731 |
| 8,266,673 B2* | 9/2012 | Hu ...................... H04L 63/0227 726/1 |
| 8,335,848 B2 | 12/2012 | Wenig |
| 8,381,088 B2 | 2/2013 | Kikin-Gil et al. |
| 8,533,532 B2 | 9/2013 | Wenig |
| 8,583,772 B2 | 11/2013 | Wenig |
| 8,832,846 B2* | 9/2014 | Udani .................. G06F 21/51 726/26 |
| 8,838,736 B2 | 9/2014 | Swahn |
| 2002/0049840 A1 | 4/2002 | Squire |
| 2002/0056091 A1 | 5/2002 | Bala |
| 2002/0065912 A1 | 5/2002 | Catchpole et al. |
| 2002/0070953 A1 | 6/2002 | Barg et al. |
| 2002/0083169 A1* | 6/2002 | Aki et al. ...................... 709/224 |
| 2002/0083183 A1 | 6/2002 | Pujare et al. |
| 2002/0112035 A1 | 8/2002 | Carey |
| 2002/0165954 A1 | 11/2002 | Eshghi et al. |
| 2003/0005000 A1 | 1/2003 | Landsman |
| 2003/0023715 A1 | 1/2003 | Reiner et al. |
| 2003/0128233 A1 | 7/2003 | Kasriel |
| 2003/0145071 A1 | 7/2003 | Straut |
| 2003/0154289 A1 | 8/2003 | Williamson et al. |
| 2004/0019675 A1 | 1/2004 | Hebeler |
| 2004/0059809 A1 | 3/2004 | Benedikt et al. |
| 2004/0059997 A1 | 3/2004 | Allen et al. |
| 2004/0078464 A1 | 4/2004 | Rajan |
| 2004/0100507 A1 | 5/2004 | Hayner et al. |
| 2004/0158574 A1 | 8/2004 | Tom et al. |
| 2005/0021713 A1 | 1/2005 | Dugan et al. |
| 2005/0030966 A1 | 2/2005 | Cai et al. |
| 2005/0033803 A1 | 2/2005 | Vleet et al. |
| 2005/0066037 A1 | 3/2005 | Song et al. |
| 2005/0071464 A1 | 3/2005 | Kuwata et al. |
| 2005/0071760 A1 | 3/2005 | Jaeger |
| 2005/0086606 A1 | 4/2005 | Blennerhassett et al. |
| 2005/0188080 A1 | 8/2005 | Motsinger et al. |
| 2005/0216856 A1 | 9/2005 | Matti |
| 2005/0246651 A1 | 11/2005 | Krzanowski |
| 2005/0278565 A1 | 12/2005 | Frattura et al. |
| 2006/0048153 A1 | 3/2006 | Truong |
| 2006/0048214 A1 | 3/2006 | Pennington et al. |
| 2006/0075088 A1 | 4/2006 | Guo |
| 2006/0117055 A1 | 6/2006 | Doyle |
| 2006/0123340 A1 | 6/2006 | Bailey et al. |
| 2006/0162071 A1 | 7/2006 | Dixon et al. |
| 2006/0230105 A1 | 10/2006 | Shappir |
| 2006/0248452 A1 | 11/2006 | Lambert |
| 2007/0106692 A1 | 5/2007 | Klein |
| 2007/0174410 A1 | 7/2007 | Croft |
| 2007/0226314 A1 | 9/2007 | Eick |
| 2007/0245249 A1 | 10/2007 | Weisberg |
| 2007/0255754 A1 | 11/2007 | Gheel |
| 2008/0005661 A1 | 1/2008 | Yao et al. |
| 2008/0005793 A1 | 1/2008 | Wenig |
| 2008/0034036 A1 | 2/2008 | Takeshima et al. |
| 2008/0046562 A1 | 2/2008 | Butler |
| 2008/0046976 A1 | 2/2008 | Zuckerberg et al. |
| 2008/0052377 A1 | 2/2008 | Light |
| 2008/0127217 A1 | 5/2008 | Wang |
| 2008/0162498 A1 | 7/2008 | Omoigui |
| 2008/0184129 A1 | 7/2008 | Cancel et al. |
| 2008/0209311 A1 | 8/2008 | Agronik |
| 2008/0216094 A1 | 9/2008 | Anderson |
| 2008/0294974 A1 | 11/2008 | Nurmi et al. |
| 2009/0013347 A1 | 1/2009 | Ahanger |
| 2009/0019133 A1 | 1/2009 | Brimley |
| 2009/0024930 A1 | 1/2009 | Kim |
| 2009/0037517 A1 | 2/2009 | Frei |
| 2009/0037914 A1 | 2/2009 | Chagoly et al. |
| 2009/0063968 A1 | 3/2009 | Wenig |
| 2009/0070869 A1 | 3/2009 | Fan et al. |
| 2009/0083714 A1 | 3/2009 | Kiciman et al. |
| 2009/0132957 A1 | 5/2009 | Reddy |
| 2009/0138554 A1 | 5/2009 | Longobardi et al. |
| 2009/0228474 A1 | 9/2009 | Chiu et al. |
| 2009/0247193 A1 | 10/2009 | Kalavade |
| 2009/0254529 A1 | 10/2009 | Goldentouch |
| 2010/0007603 A1 | 1/2010 | Kirkup |
| 2010/0042573 A1 | 2/2010 | Wenig |
| 2010/0058285 A1 | 3/2010 | Meijer et al. |
| 2010/0070929 A1 | 3/2010 | Behl et al. |
| 2010/0146380 A1 | 6/2010 | Rousso |
| 2010/0169792 A1 | 7/2010 | Ascar |
| 2010/0211638 A1 | 8/2010 | Rougier |
| 2010/0251128 A1 | 9/2010 | Cordasco |
| 2010/0268694 A1* | 10/2010 | Denoue et al. ................ 707/693 |
| 2010/0318507 A1 | 12/2010 | Grant et al. |

(56) References Cited

U.S. PATENT DOCUMENTS

| | | | |
|---|---|---|---|
| 2011/0029665 | A1* | 2/2011 | Wenig et al. ............... 709/224 |
| 2011/0173239 | A1 | 7/2011 | Sayed |
| 2011/0320880 | A1* | 12/2011 | Wenig et al. ............... 714/39 |
| 2012/0002903 | A1 | 1/2012 | Wilensky |
| 2012/0038678 | A1 | 2/2012 | Hwang |
| 2012/0084437 | A1 | 4/2012 | Wenig |
| 2012/0089950 | A1 | 4/2012 | Tseng |
| 2012/0102101 | A1 | 4/2012 | Wenig |
| 2012/0151329 | A1 | 6/2012 | Cordasco |
| 2012/0157122 | A1 | 6/2012 | Niranjan |
| 2012/0173966 | A1 | 7/2012 | Powell |
| 2013/0069947 | A1 | 3/2013 | Berstler |
| 2013/0091417 | A1 | 4/2013 | Cordasco |
| 2013/0104065 | A1 | 4/2013 | Stecher |
| 2013/0339428 | A1 | 12/2013 | Wenig |
| 2014/0063174 | A1 | 3/2014 | Junuzovic |
| 2014/0108911 | A1 | 4/2014 | Damale |
| 2014/0109018 | A1 | 4/2014 | Casey |
| 2014/0115712 | A1* | 4/2014 | Powell ............... G06F 21/6263 726/26 |
| 2014/0137052 | A1 | 5/2014 | Hernandez |
| 2014/0143652 | A1 | 5/2014 | Deloach |
| 2014/0250110 | A1 | 9/2014 | Yang |

FOREIGN PATENT DOCUMENTS

| | | |
|---|---|---|
| CN | 101827102 A | 9/2010 |
| EP | 0326283 | 8/1989 |
| EP | 0843449 | 5/1998 |
| EP | 1097428 | 6/2002 |
| EP | 07840244.3 | 2/2008 |
| EP | 08769998.9 | 3/2009 |
| GB | 2357680 | 6/2008 |
| WO | 9825372 | 6/1998 |
| WO | WO 98/26571 | 6/1998 |
| WO | 9836520 | 8/1998 |
| WO | 0013371 | 3/2000 |
| WO | 0217165 | 2/2002 |
| WO | 2008/019193 | 2/2008 |
| WO | 2009/029316 | 3/2009 |
| WO | 2010019258 | 2/2010 |

OTHER PUBLICATIONS

Written Opinion of the International Searching Authority for PCT/US2013/023636; Date of Mailing Aug. 13, 2013.
Rubio, An Introduction to JSON, Feb. 28, 2007, http://www.oracle.com/technetwork/articles/entarch/introduction-json-097942.html.
Teare, An Introduction to Ajax, Aug. 2005, http://www.oracle.com/technetwork/articlesientarch/ajax-introduction-096831.html.
Stolowitz Ford Cowger LLP; Listing of Related Cases; Dec. 19, 2013.
Summons to attend oral proceedings pursuant to Rule 115(1) in EP App. No. 07840244.3; Dated Dec. 12, 2013.
Reed Martin; Using Google Analytics Site Overlay; Community Spark; Apr. 13, 2007. Online: <http://www.communityspark.com/using-google-analytics-site-overlay/>.
Stolowitz Ford Cowger LLP Listing of Related Cases May 14, 2013.
Smith et al., "Automated Protocol Analysis," Human Computer Interaction, 8:101-145, 1993.
Bishop, Matt et al., "A Model of Security Monitoring", Department of Mathematics and Computer Science, Dartmouth College, pp. 46-52. Dec. 1989.
Al-Qaimare G., et al., Kaldi: A Computer-Aided Usability Engineering Tool for Supporting Testing and Analysis of Human-Computer Interation:, Computer-Aided Design of User Interfaces. Proceedings of the International Conference on Computer-Aided Design of User Interfaces, Proceedings of CADUI, xx, xx, Oct. 21, 1999 (Oct. 21, 1999), pp. 337-355.
International Search Report for PCT/US08/65582; Date of Mailing Sep. 11, 2008.
International Search Report for PCT/US2007/071096; Date of mailing May 13, 2008.
Written Opinion of the International Searching Authority for PCT/US08/65582; Mailing date Sep. 11, 2008.
Written Opinion of the International Searching Authority for PCT/US07/71096; Mailing date May 13, 2008.
PCT Search Report for PCT/US2011/033813; Mailing Date Jul. 28, 2011.
Written Opinion of the International Searching Authority for PCT/US2011/033813; Mailing Date Jul. 28, 2011.
International Search Report for PCT/US09/04654; Date of mailing Oct. 2, 2009.
Written Opinion of the International Searching Authority; PCT/US09/04654; Date of mailing Oct. 2, 2009.
Holloway, et al., "Cryptographic Initialization Test", IBM Technical Dsiclsoure Bulletin, pp. 195-198, Feb. 1991.
International Search Report for PCT/US11/35410; Date of mailing Dec. 14, 2011.
Written Opinion of the International Searching Authority; PCT/US11/35410; Date of mailing Dec. 14, 2011.
Han et al., "Using Ajax for Desktop-;like Geospatial Web Application Development," Geoinformatics, 2009 17th International Conference on Aug. 12-14, 2009, <http://geobrain.laits.gmu.edu/geobrainhome/docs/GeOnAS_Ajax.pdf>.
Lubarsky, How to Delete Cookie Using Javascript, Aug. 19, 2007, http:web.archive.org/web/20070819123555/http://blogs.x2line.corn/al/articles/316.aspx.
International Search Report for PCT/US12/25971; Date of mailing May 31, 2012.
Written Opinion of the International Searching Authority for PCT/US12/25971; Date of mailing May 31, 2012.
Peter Brusilovsky et. al., "Adaptive and Intelligent Web-based Educational Systems," International Journal of Artificial Intelligence in Education, Apr. 1, 2003 (Apr. 1, 2003), pp. 159-172, XP55039152, The Netherlands Retrieved from the Internet: URL: http://www.sis.pitt.edu/~peterb/papers/AIWBES.pdf [retrieved on Sep. 25, 2012] p. 160-161.
Atterer R et al. : "Knowing the User's Every Move- User Activity Tracking for Website Usability Evaluation and Implicit Interaction," WWW '06 Procedings of the 15th World Wide Web, ACM, New York, NY, USA, May 22, 2006 (May 22, 2006), pp. 203-212, XP002519605, DOI: 10.1145/1135777.1135811 ISBN 978-1-5959-323-2.
Stolowitz Ford Cowger; Listing of Related Cases; Jan. 15, 2013.
Mel; Distribute Paths to Separate Layers—Illustrator Tutorial; pp. 1-3; Aug. 23, 2009.
Chinese Office Action dated Jul. 20, 2016, 11 pages.

* cited by examiner

RULE #1
PRIVACY METRICS

150A — 172A — TEST: ###-##-####
174A — ACTION: XXX-XX-XXXX

| WEB SESSION ID | WEB PAGE ID | FIELD ID |
|---|---|---|
| WEB BROWSER | TIME STAMP | # OF CALLS |
| # OF COMPLETED ACTIONS || EXECUTION TIME |

176A

RULE #2
PRIVACY METRICS

150B — 172B — TEST: #### #### #### ####
174B — ACTION: XXXX XXXX XXXX ####

| WEB SESSION ID | WEB PAGE ID | FIELD ID |
|---|---|---|
| WEB BROWSER | TIME STAMP | # OF CALLS |
| # OF COMPLETED ACTIONS || EXECUTION TIME |

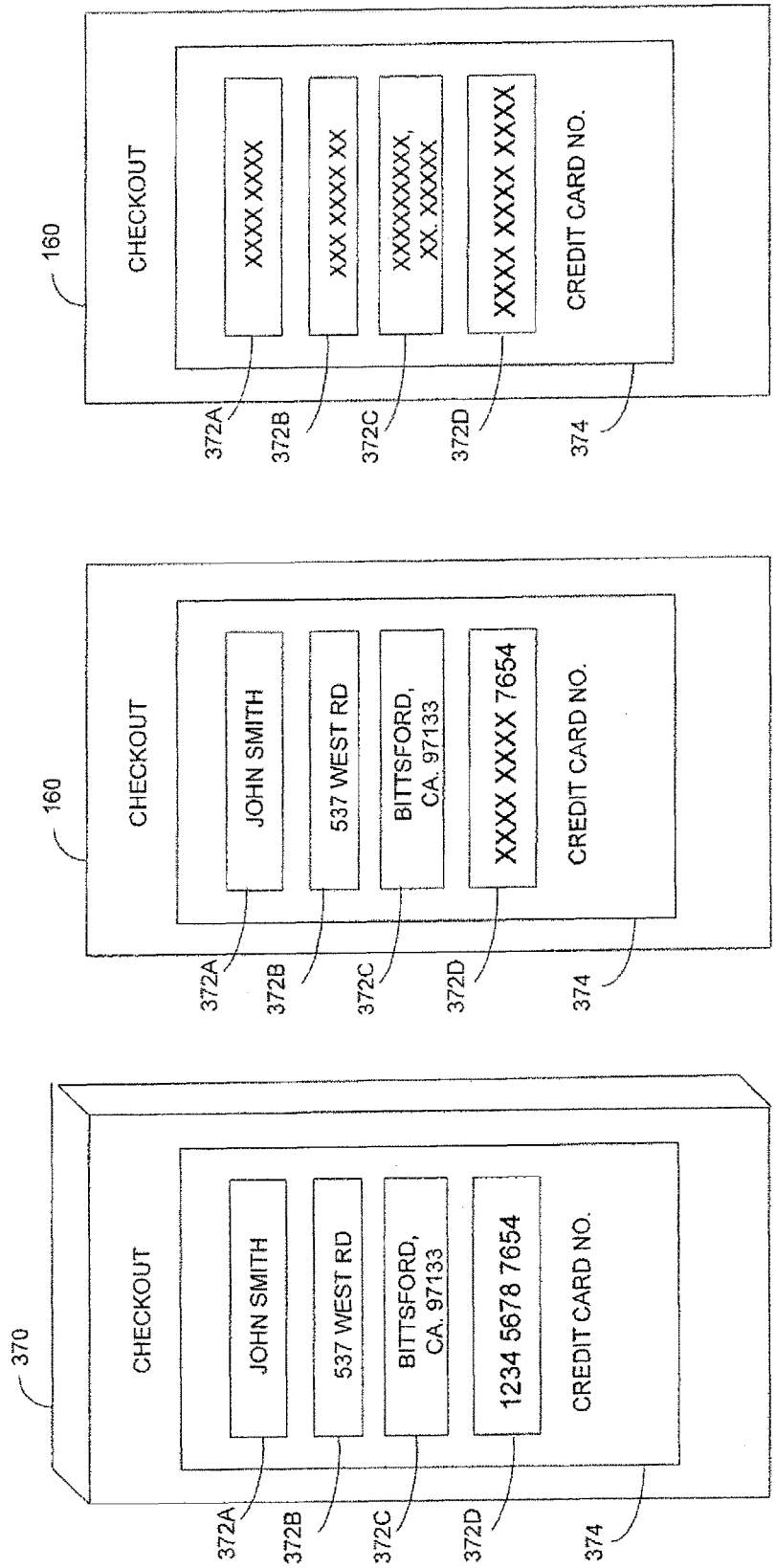

METHOD AND APPARATUS FOR GENERATING PRIVACY PROFILES

BACKGROUND

Monitoring and replay systems may capture web session data, such as web pages sent from a web application server to a client computer and user interface events entered into the web pages at the client computer. The captured web session data may be used to replay and analyze user experiences during the web sessions. For example, the replayed web sessions may be used to identify problems users may be have while navigating through web pages during the web session.

Sensitive personal information may be entered into the web pages during the web sessions. For example, the web sessions may involve on-line purchases of products and/or services. In order to complete the on-line transactions, users may need to enter social security numbers, passwords, credit card numbers, bank account numbers, health information, stock information, home addresses, or the like, or any combination thereof.

Government privacy regulations may prohibit the retention of certain personal information or limit the retention of the personal information to certified entities. These privacy regulations may require monitoring and replay systems to filter sensitive personal information before storing the captured web session data in a database for subsequent replay analysis.

Current monitoring and replay systems attempt to remove sensitive personal information. However, some personal information may not be successfully filtered from the captured web session data. For example, a web application may change the name of a web page or the name of a field in the web page that was previously used for triggering the privacy rules that filter the sensitive personal information. If the sensitive personal information is not filtered, some or all of the captured web session data may need to be destroyed.

BRIEF DESCRIPTION OF THE DRAWINGS

FIG. 3 depicts examples of privacy metrics generated by the privacy processing system.

FIGS. 10A, 10B and 10C depict examples of replayed web sessions showing correct and incorrect privacy filtering.

DETAILED DESCRIPTION

Figure 1:
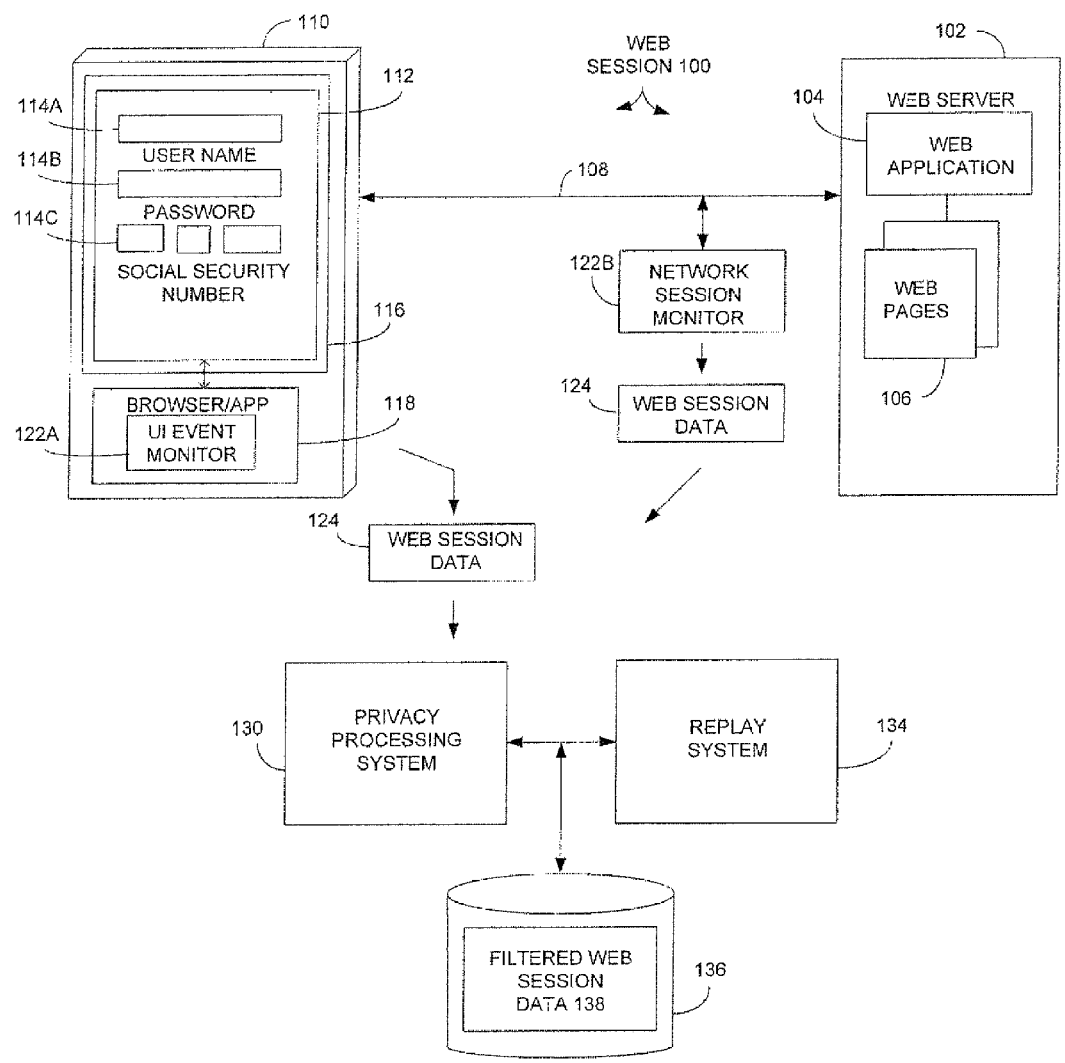
FIG. 1 depicts an example of a system for filtering information from captured web session data.

FIG. 1 depicts a web session 100 conducted between a web application 104 operating on a web server 102 and a computing device 110. Web application 104 may support any type of online web session such as online purchases, online financial or medical services, social networking, etc. Of course, these are just examples, and any type of electronic web based transaction or activity may be performed using web application 104.

Computing device 110 may comprise a Personal Computer (PC), laptop computer, wireless Personal Digital Assistant (PDA), cellular telephone, smart phone, tablet, or any other wired or wireless device that accesses and exchanges information with web application 104. Any number of computing devices 110 may conduct different web sessions 100 with web application 104 at any geographical location and at any time of day.

Computing device 110 may communicate with web application 104 over a network connection 108. Network connection 108 may comprise any combination of connections over an Internet network, a wireless network, a WiFi network, a telephone network, a Public Services Telephone Network (PSTN), a cellular network, a cable network, a Wide Area Network (WAN), a Local Area Network (LAN), or the like, or any combination thereof.

In one example, a web browser or web application 118 operating on computing device 110 may send Hyper Text Transfer Protocol (HTTP) requests to web application 104 over network connection 108. Web application 104 may send back one or more of web pages 106 in response to the HTTP requests and computing device 110 may display the web pages via the web browser or application 118 on a computer screen 116. For example, web browser or mobile application 118 may display an electronic web page 112 that contains fields 114A-114C for entering a user name, password, and social security number, respectively. Web application 104 may send additional web pages 106 and/or responses to computing device 110 in response to the information entered into fields 114.

Web session monitors 122 may capture web session data 124 during web session 100. Web session data 124 may include network data transferred over network connection 108 between computing device 110 and web application 104 and user interface events generated on computing device 110. For example, web session data 124 may comprise the Hyper Text Transfer Protocol (HTTP) requests and other data requests sent from computing device 110 to web application 104 and the Hyper Text Markup Language (HTML) web pages 106 and other responses sent back to computing device 110 from web application 104.

Some of web session data 124 may include user interface events entered by a user into computing device 110, such as mouse clicks, keystrokes, alpha-numeric data, or the like, or any combination thereof. For example, some of the user interface events may comprise data entered into fields 114 of web page 112 or may comprise selections of icons or links on web page 112.

Other web session data 124 may comprise webpage logic/code sent by web application 104 along with web pages 106 to computing device 110 that further determine the different states or operations in the web pages. Some of the web session data may be generated locally on processing device 110 and never sent over network connection 108. For example, the control logic within web page 112 may change the state of web page 112 in response to user inputs without sending any data back to web application 104. In another example, a batch data transfer of only completed information in web page 112 may be transferred back to web application 104 over network connection 108.

In another example, some web session data 124 may comprise document object model (DOM) events within the web pages. For example, changes in the DOM of displayed web page 106 may be captured by UI event monitor 122A as some of web session data 124. In yet another example, web session data 124 may comprise operating parameters or any other logged data in computing device 110 and/or web server 102. For example, web session data 124 may comprise network bandwidth indicators, processor bandwidth indicators, network condition indicators, computer operating conditions, or the like, or any combination thereof.

In one example, network session monitor 122B may capture the network data, such as web pages, requests, responses, and/or logic exchanged between computing device 110 and web application 104 over network connection 108. User interface (UI) monitor 122A may capture the user interface events generated locally at computing device 110. In another example, UI monitor 122A also may capture some or all of the network data exchanged between computing device 110 and web application 104 over network connection 108.

In yet another example, UI event monitor 122A and/or network session monitor 122B may not capture all the web session data 124 and may only detect occurrences of some web session events. In this example, monitors 122A and 122B may send unique identifiers identifying occurrences of certain web session events and may send timestamps indicating when the web session events were detected.

Examples of systems for capturing and/or identifying web session data and events are described in U.S. Pat. No. 6,286,030 issued Sep. 4, 2001, entitled: Systems and Methods for Recording and Visually Recreating Sessions in a Client-Server Environment now reissued as U.S. Pat. No. RE41903; U.S. Pat. No. 8,127,000 issued Feb. 28, 2012, entitled: Method and Apparatus for Monitoring and Synchronizing User Interface Events with Network Data; and U.S. patent application Ser. No. 13/419,179 filed Mar. 13, 2012, entitled: Method and Apparatus for Intelligent Capture of Document Object Model Events which are all herein incorporated by reference in their entireties.

During web session 100, a user may enter a user name into field 114A, a password into field 114B and/or a social security number into field 114C. Due to the security requirements discussed above, the password and/or social security number may need to be filtered before captured web session data 124 can be stored in a database 136.

A privacy processing system 130 filters sensitive personal information, such as the password and/or social security number from captured web session data 124. Filtering refers to any combination of removing, blocking, replacing, encrypting, hashing, or the like, information in web session data 124. Privacy processing system 130 stores filtered web session data 138 in web session database 136. A replay system 134 can then use the captured and now filtered web session data 138 to replay the original web session 100 without displaying sensitive personal information. One example of a replay system 134 is described in U.S. Pat. No. 8,127,000, entitled: METHOD AND APPARATUS FOR MONITORING AND SYNCHRONIZING USER INTERFACE EVENTS WITH NETWORK DATA, issued Feb. 28, 2012 which has been incorporated by reference in its entirety.

Privacy processing system 130 may apply privacy rules to the captured web session data 124 to remove the sensitive personal information. Privacy profiles or privacy metadata may be generated for the privacy rules. For example, the privacy profiles may identify how often the privacy rules are called, how often the privacy rules successfully complete actions, and amounts of processing time required to execute the privacy rules. The privacy profiles may detect privacy filtering problems, such as privacy rules that do not filter personal information or filter the wrong information from the web session data, or if certain patterns of data require abnormally large privacy resources, such as time or CPU usage. In addition, any big deviation in privacy resource usage may indicate a change to the website or in end user behavior.

Filtering and/or encrypting sensitive personal information in captured web session data may be computationally expensive. For example, a particular web site may service hundreds of millions of users and hundreds of millions of associated web sessions each day. The privacy profiles may identify privacy rules that are written incorrectly or inefficiently and waste processing bandwidth. The identified privacy rules can be identified and rewritten so privacy rules can more efficiently search and filter personal information from the millions of web sessions.

Privacy processing system 130 may detect other web session events or states that may impact user experiences during web sessions 100. For example, the privacy profiles may identify incorrect user actions, virus attacks, errors or gaps in the logic of the source web application, etc. Thus, privacy processing system 130 not only generates quantitative privacy filtering metrics but may also identify other general problems with the web sessions.

Figure 2:
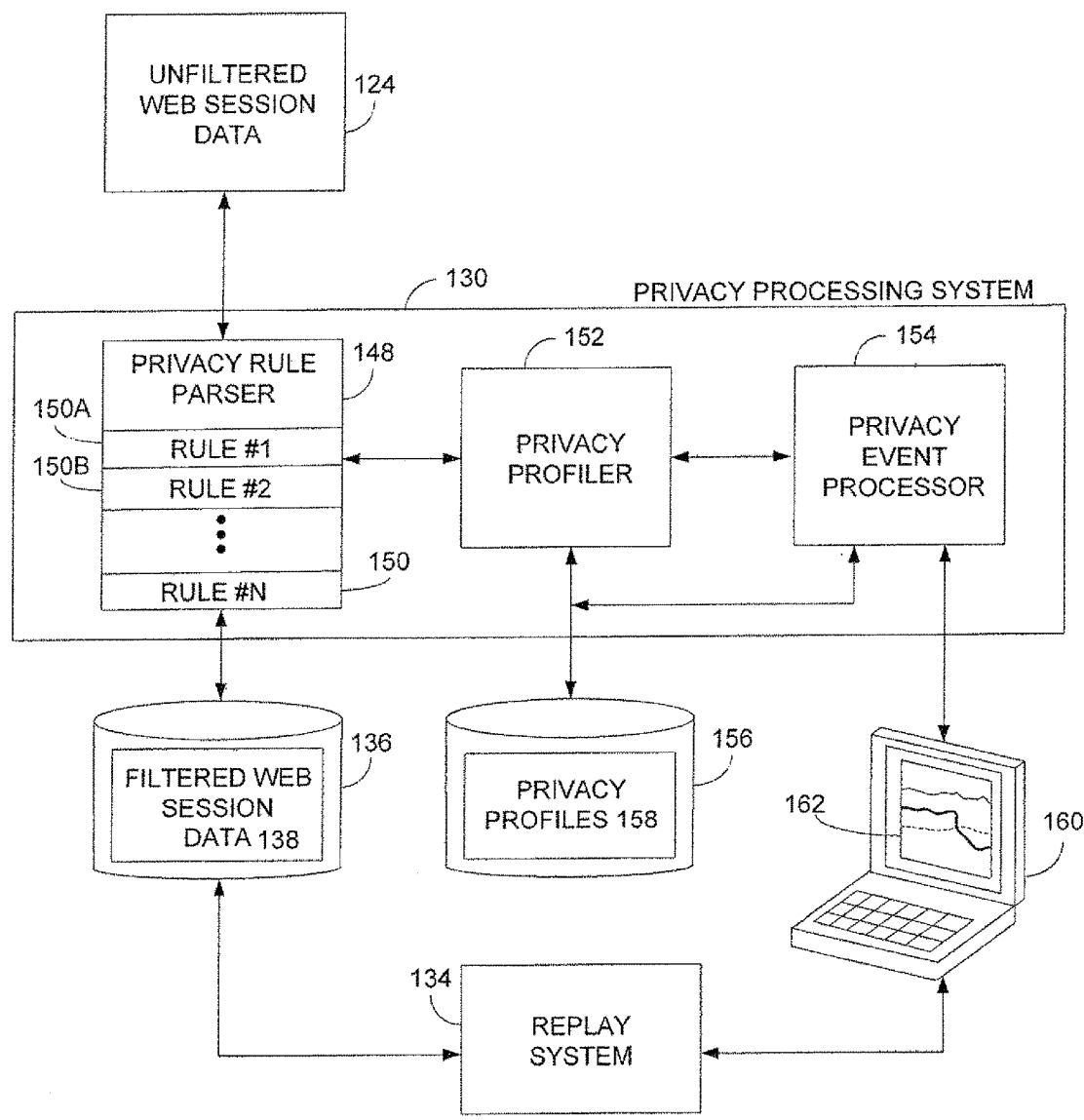
FIG. 2 depicts an example of a privacy processing system.

FIG. 2 depicts in more detail one example of privacy processing system 130. A privacy rule parser 148 may apply privacy rules 150 to web session data 124 captured from web sessions 100. Different rules 150 may be applied to different web pages and different data captured during web session 100. For example, a first rule 150A may search for a particular web page in captured web session data 124 that may contain a social security number. A second rule 150B may search for different fields in several different web pages in web session data 124 that may contain a credit card number.

Rules 150A and 150B may filter the web session data by replacing, blocking, hashing, encrypting, etc. sensitive personal information, such as social security numbers or credit card numbers. Filtered web session data 138 is stored in database 136 and can then be used for subsequent replay and analysis by replay system 134.

A privacy profiler 152 may generate privacy profiles 158 for privacy rules 150. For example, privacy profiler 152 may track the number of times each rule 150 is called when filtering web session data 124, the number of times each rule 150 succeeded in filtering information in web session data 124, and/or the amount of time required to execute rules 150 while filtering web session data 124.

Privacy profiler 152 may generate privacy profiles 158 by aggregating the privacy metrics for rules 150. For example, privacy profiler 152 may calculate an average number of times over the last five minutes that rule 150A is called while filtering web session data 124. The aggregated privacy metrics may be used as a baseline or "profile" of typical or normal privacy filtering behavior. Security metrics outside of privacy profile thresholds may be indicative of privacy filtering problems or other web session problems. For example, there may be a substantial change in the average number of times a particular privacy rule is called for each captured web session. In another example, there may be a substantial change in the amount of time required to successfully complete execution of a privacy rule.

These changes in the privacy metrics may be caused by changes in the web application or web pages used by the web application. As mentioned above, a user may enter personal information into particular fields within particular web pages. Privacy rule parser 148 may only call rule 150A when particular web page names or field names are identified in captured web session data 124. If the enterprise operating the web application changes the web page name or field name, privacy rule parser 148 may no longer call rule 150A to filter data in the renamed web page. Accordingly, a social security number entered into the renamed web page may no longer be filtered from web session data 124 compromising the overall privacy and security of filtered web session data 138.

In another example, a change in the amount of time required to successfully complete privacy rules 150 also may indicate a privacy filtering problem. For example, web browsers, web pages, and/or web page logic may change or reformat data entered into the web pages. The changed or reformatted data may cause privacy rule parser 148 to unintentionally call privacy rules 150 for web pages that do not contain personal information or may cause rules 150 to filter the wrong data. These incorrect or unintentional filtering operations may waste processing bandwidth and/or remove web session data needed for accurately replaying the captured web sessions.

In yet another example, a change in the privacy metrics may indicate an abnormal web session. For example, a denial of service attack or other bot attacks may substantially change the number or percentage of times a particular rule 150 is called or the amount of time required to successfully complete the privacy rule. Privacy profiles 158 can identify privacy metric changes and isolate privacy filtering or web session problems.

A privacy event processor 154 may display graphs 162 on a computing device 160 for privacy profiles 158. For example, graphs 162 may identify the average privacy metric values for different privacy rules. Any substantial deviations in graphs 162 may indicate privacy filtering problems and/or web session problems. A user may direct privacy event processor 154 to display the privacy profiles for different dimensions, such as for particular privacy rules, privacy rule parameters, web session categories, or web browsers. For example, the user may direct privacy event processor 154 to display privacy metrics associated with different desk-top web browsers and mobile applications.

Computing device 160 may use replay system 134 to further isolate privacy filtering irregularities. For example, a user may compare replayed filtered web sessions prior to large privacy metric changes with replayed web sessions after the large privacy metric changes. Any filtering problems identified during replay can then be corrected by modifying the associated rules 150 in privacy rule parser 148.

FIG. 3 depicts in more detail examples of privacy rules 150 and privacy metrics 176 used and generated by the privacy rule parser. A first rule 150A may comprise a test 172A that looks for a particular set of numbers, text, values, parameters, etc. For example, test 172A may test for a first set of three numbers separated from a second set of two numbers by a space or dash. Test 172A may then look for a third set of four numbers separated by a second space or dash from the second set of two numbers.

Upon detection of the number sequence, rule 150A may trigger an action 174A. In one example, the action 174A for rule 150A may replace the detected sequence of numbers with an "X". Examples of other actions may include only "X-ing" out some of the numbers in the identified sequence or using a hash algorithm to encrypt the number sequence. In one example, the encrypted number sequence might not be decrypted, but could still be used with the hash algorithm to confirm association of the number with a particular user. Any other actions may be used for filtering information.

A set of privacy metrics 176A may be generated by the privacy rule parser in association with privacy rule 150A. For example, privacy metrics 176 may include web session identifiers identifying the particular web sessions where rule 150A is called. A web page identifier may identify particular web pages in the web session data where rule 150A is called. A field identifier may identify particular fields in the captured web session data where rule 150A is called for filtering data entered into the fields.

A web browser identifier may identify a particular web browser or application used during the associated web session where rule 150A was called. A time stamp metric may identify when the web sessions producing the captured web session data took place and/or may identify when rule 150A was called for filtering the captured web session data. A "# of calls" metric may identify the number of times rule 150A was called while filtering the captured web session data or the number of times rule 150A was called for individual web sessions, web page, etc. A "# of completed actions" metric may identify the number of times rule 150A successfully completed an associated filtering action. For example, the # of actions may identify the number of times rule 150A replaced the sequence in test 172A with the X's in action 174A. An execution time metric may identify the amount of processing time required to complete rule 150A for a web session, web page, etc.

A second rule 150B may comprise a test 172B that also parses the web session data for a particular set of numbers, text, values, parameters, etc. In this example, test 172B may test for a sequence of numbers associated with a credit card number. The number sequence may be four sets of four numbers separated by spaces or dashes. In one example, satisfaction of test 172B may initiate an associated action 174B that replaces the first twelve numbers of the detected sequence of sixteen numbers with "X's". Another similar set of privacy metrics 176B may be generated for rule 150B.

Rules 150A and 150B are just examples of any variety of tests and actions that may be applied to the web session data. Rules 150 may be applied to any combination of web session data. For example, rules 150 may only be called for particular web pages that query a user for sensitive personal information, such as a social security number. Other rules 150 may be called to filter data associated with other sensitive data captured on other web pages.

Figure 4:
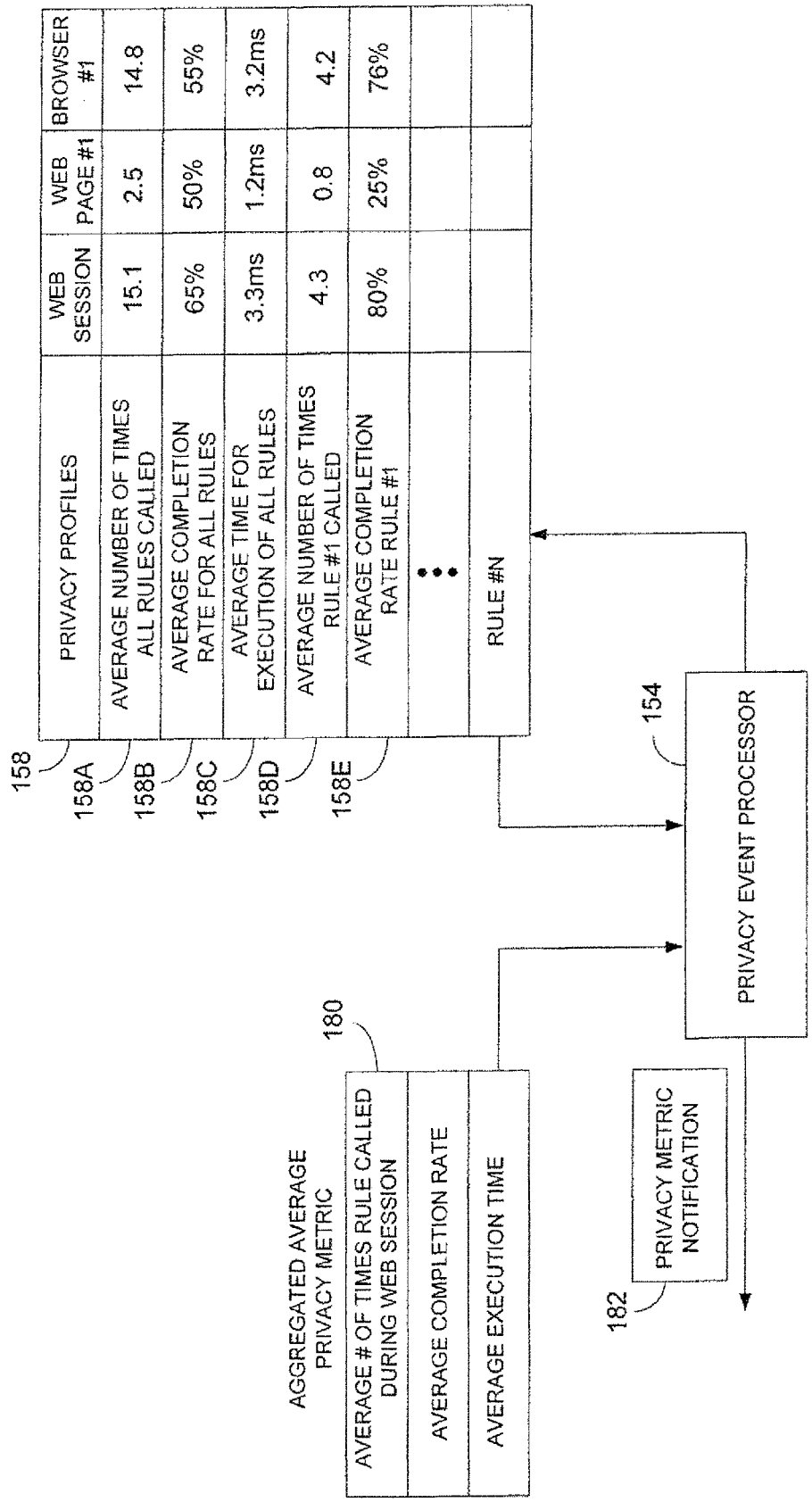
FIG. 4 depicts an example process for comparing privacy metrics with privacy profiles.

FIG. 4 depicts an example of privacy profiles 158 generated by privacy profiler 152 in FIG. 3 from the privacy metrics. Privacy profiles 158 may identify different statistical dimensions associated with filtering the web session data. For example, a first privacy profile 158A may identify the average number of times any of the rules in the privacy rule parser were called while filtering the web session data. Privacy profile 158A may be derived for different categories, such as for time periods, web sessions, web pages, web browsers and/or mobile web applications.

A privacy profile 158B may identify the average successful completion rate for the rules indicating the average percentage of times the privacy rules successfully filter information. A privacy profile 158C may identify an average amount of time required for all of the rules to filter the web session data for web sessions, web pages, browsers, etc.

A privacy profile 158D may identify the average number of times a particular rule #1 is called while filtering the web session data. A privacy profile 158E may identify the successful completion rate for rule #1. Privacy profiles 158 may be associated with any other privacy rules and collected privacy dimensions.

The privacy profiler may generate aggregated average privacy metrics 180 for aggregation periods. For example, privacy profiler may aggregate the number of times different rules are called, aggregate the percentage of times the rules successfully complete filtering actions, and aggregate the amounts of time required for the rules to complete execution. The privacy metrics may be aggregated for some selectable time period, such as five minutes, and the aggregated values averaged to generate privacy metrics 180.

Privacy event processor 154 may compare privacy metrics 180 for each aggregated time period with privacy profiles 158. A privacy metric notification 182 may be generated for any privacy metrics 180 that are outside of threshold ranges for privacy profiles 158. For example, the privacy profiler may determine standard deviations for the values in privacy profiles 158. Privacy event processor 154 may send notification 182 or create an entry in a log file for any of the privacy metrics 180 that are outside of the standard deviations for associated privacy profiles 158.

For example, rule #1 may have successfully completed 100% of the time over the last five minute aggregation period. The average successful completion rate in privacy profile 158E for rule #1 may be 80 percent and the standard deviation may be +/−4%. Thus, the threshold range for privacy profile 158E may be between 76% and 84%. Since the successful completion rate for rule #1 in privacy metrics 180 is outside of the threshold range for privacy profile 158E, privacy event processor 154 may generate a notification 182 or generate an entry in a file or table identifying privacy metric 180 for rule #1 as an outlier.

Privacy event processor 154 also may automatically determine differences in the web session data associated with different privacy metrics. For example, the captured web session data may include Document Object Models (DOMs) for the web pages. Privacy event processor 154 may detect privacy metrics outside of the privacy profile thresholds. The DOMs for filtered web pages having privacy metrics within the privacy profile thresholds may be compared with the DOMs for filtered web pages with privacy metrics outside of the privacy profile thresholds. The DOM differences may be identified and sent to the operator. For example, the DOM differences may identify a web page with a changed name that may have prevented rule #1 from correctly triggering.

Figure 5:
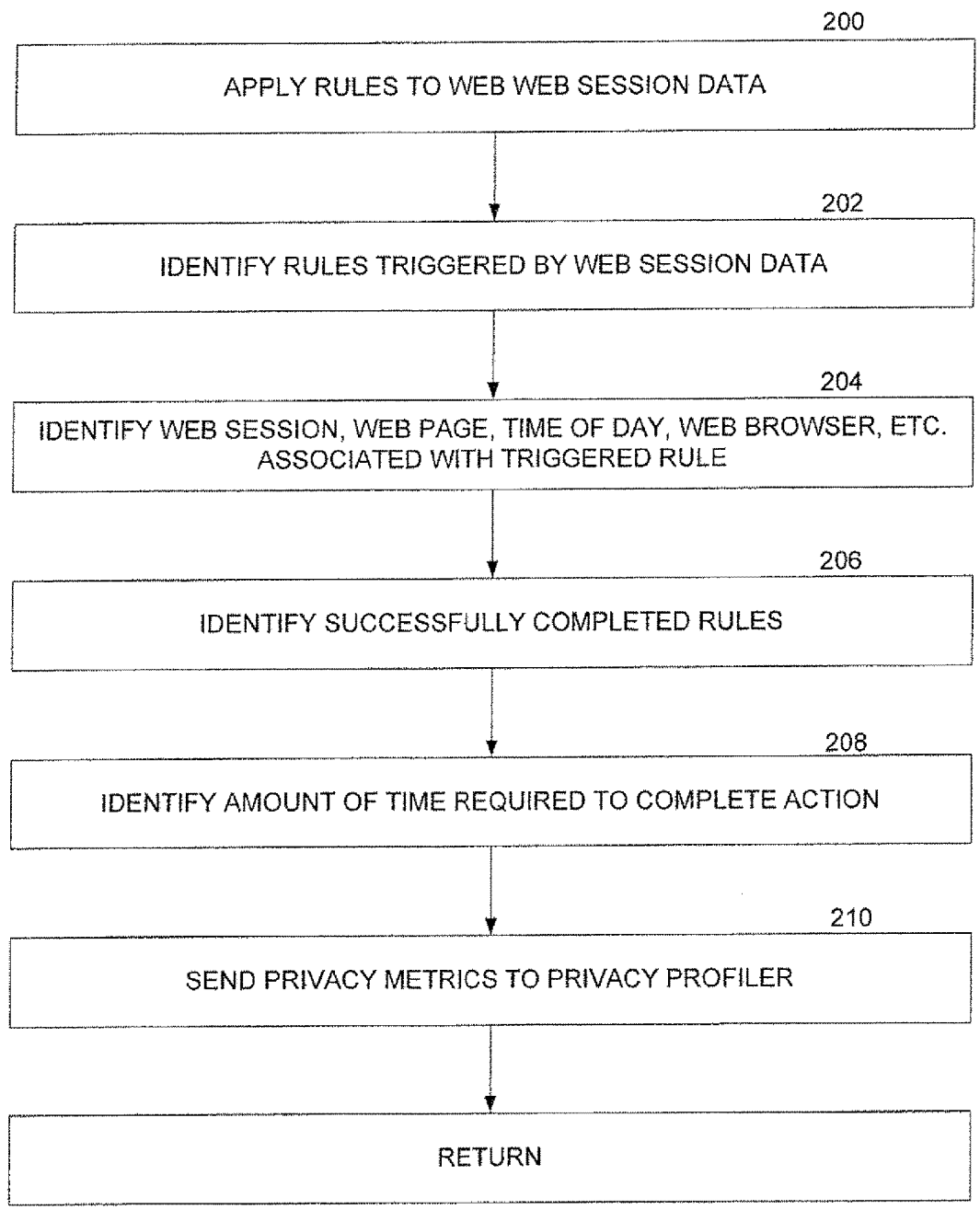
FIG. 5 depicts an example process for generating privacy metrics.

FIG. 5 depicts an example process for generating privacy metrics. In operation 200, privacy rules are applied to captured web session data received from the web session monitoring systems. As mentioned above any number of web sessions may be continuously, periodically, or randomly monitored and the associated web session data sent to the privacy processing system.

Privacy rules called or triggered during the privacy filtering process are identified in operation 202. For example, a rule may be called when a particular web page is identified in the web session data and the rule may not be called when that web page is never opened during the captured web session. In operation 204, privacy metrics are generated for the privacy rules. For example, each web session and web page may have an associated identifier. The privacy rule parser may identify the web sessions and/or web pages where the rules are triggered. The privacy rule parser may identify any other privacy metrics associated with the rules, such a time or day, when the rules are triggered, a type of web browser used on client site where the rule was triggered, etc.

In operation 206, the privacy rule parser may determine if the rules are successfully completed. For example, the privacy rules may be triggered whenever a particular web page is identified. The triggered rule may then execute a test to identify any data in the web page satisfying a particular condition and/or matching a particular value, sequence, location, etc. If the test is satisfied, the rule performs an associated action. For example, the action may replace a matching combination of numbers with X's. Replacement of the matching combination of numbers is identified as a successful completion of the rule.

In operation 208, the amounts of time required to complete the privacy rules may be identified. For example, privacy rules may need to apply an associated test to all of the data associated with one or more web pages. The privacy rule parser may track the amount of processing time required to parse through the one or more web pages. The time can be tracked on any other variety of dimensions or categories, such as for periods of time, web sessions, web pages, particular fields in the web pages, etc. In operation 210, the privacy metrics are sent to the privacy profiler.

Figure 6:
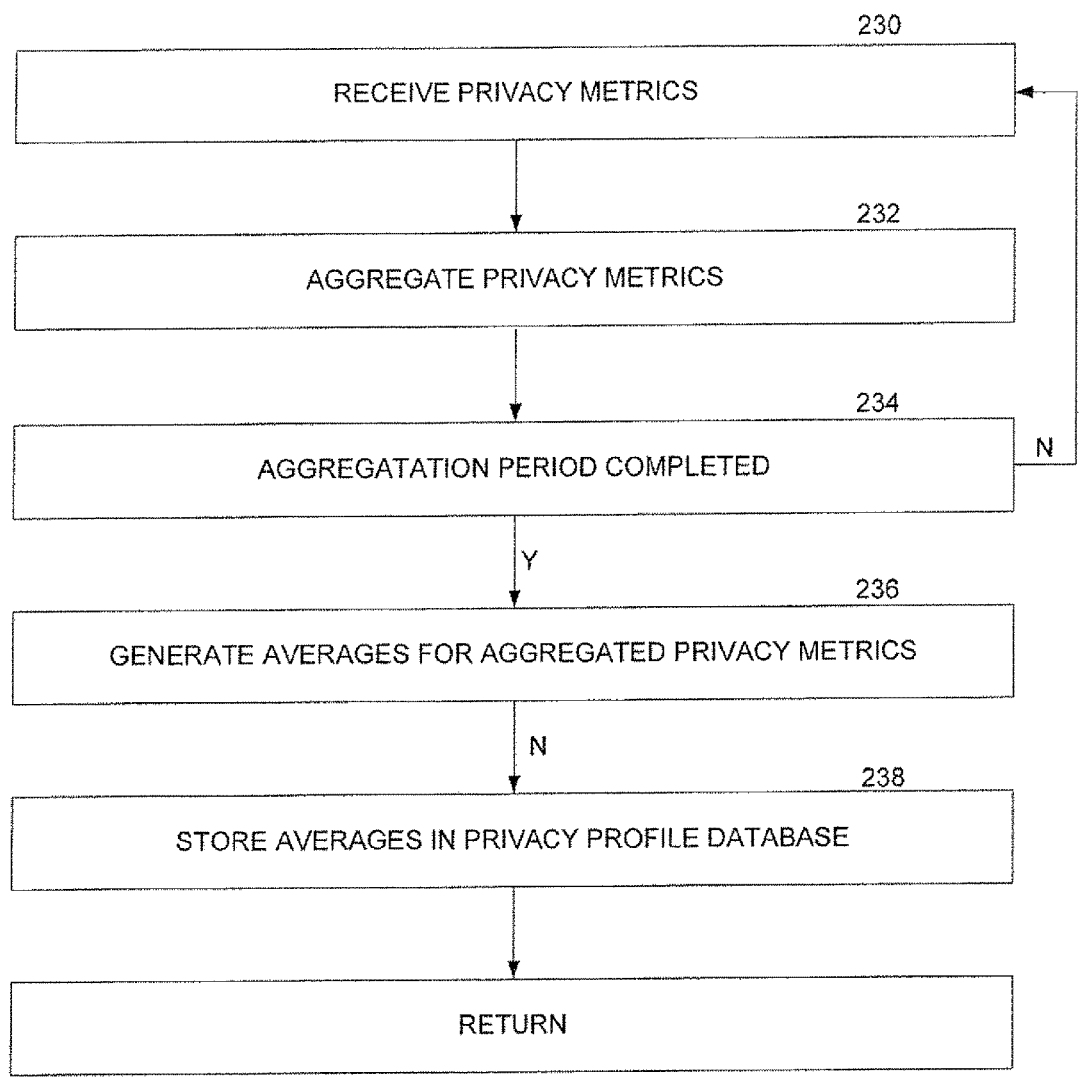
FIG. 6 depicts an example process for generating privacy profiles.

FIG. 6 depicts an example process for generating privacy profiles. The privacy profiler receives the privacy metrics from the privacy rule parser in operation 230. The privacy metrics are aggregated in operation 232 for a selectable time period. For example, the privacy profiler may count the total number of times a particular rule is triggered during an aggregation period. The aggregation period may be any selectable time period, such as seconds, minutes, hours, days, etc. The privacy metrics may be aggregated for different dimensions, such as for all privacy rules, individual privacy rules, privacy rule calls, privacy rule completions, privacy rule execution times, web sessions, web page, etc.

Operation 234 determines when the aggregation period has completed. For example, the aggregation period may be five minutes and the privacy profiler may count the number of times each privacy rule is trigger during the five minute aggregation period.

In operation 236, averages may be calculated for certain privacy metrics. For example, the privacy profiler may calculate the average number of times the privacy rules are triggered for each web session, the average completion rate for the privacy rules, and the average execution times for the privacy rules. Operation 238 stores the aggregated averaged privacy metrics in a database as the privacy profiles.

Figure 7:
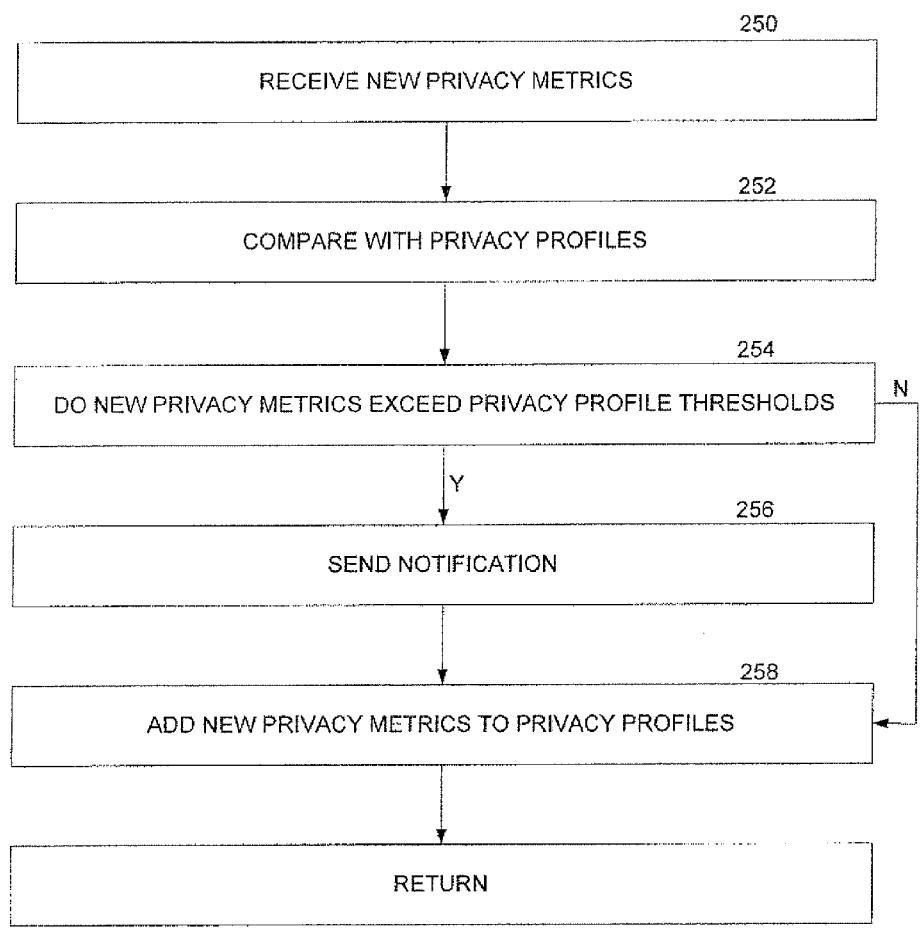
FIG. 7 depicts an example of a process for detecting irregular privacy metrics.

FIG. 7 depicts an example process for automatically identifying irregularities in the privacy filtering process or irregularities in the captured web sessions. In operation 250, the privacy event processor may receive new privacy metrics from the privacy profiler. For example, the new privacy metrics may be associated with the last five minutes of privacy filtering by the privacy rule parser.

In operation 252, the new privacy metrics may be compared with previously generated privacy profiles. For example, as described above, the average execution time for a particular privacy rule over the last five minutes may be compared with the average execution times identified with the rule in the privacy profiles. The privacy event processor may send a notification in operation 256 for any of the most recent privacy metrics that extend outside of a threshold range of the privacy profiles in operation 254. For example, an email may be sent to a system operator or an entry may be added to a log file identifying the particular rule, associated privacy metrics, and any other associated web session information, such as time, web session, web page, etc.

In operation 258, the new privacy metrics may be added to the existing privacy profiles. For example, the privacy profiles may track the average execution times of the rules over entire days, weeks, months, years. The new privacy metrics may identify the next time period for the privacy profile. In one example, the new privacy metrics may be further accumulated with other accumulated and averaged privacy metrics in the privacy profiles. For example, all of the privacy metrics for a last hour may be accumulated and averaged to generate one reference point in a day, week, or month long privacy profile.

Figure 8A:
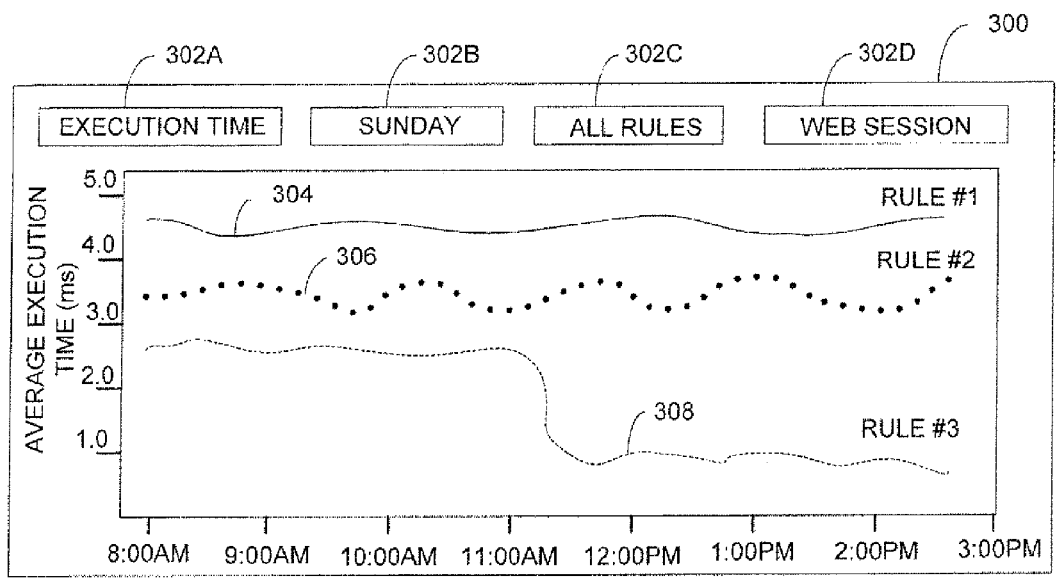
FIGS. 8A and 8B depict example graphs displaying average execution times for privacy rules.
Figure 8B:
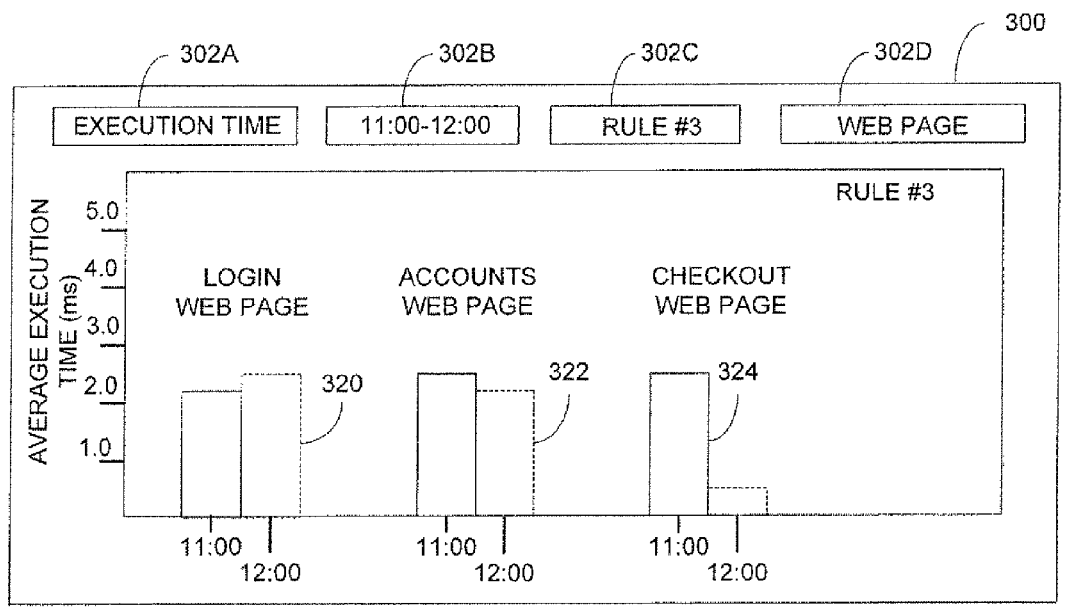

FIGS. 8A and 8B depict examples of privacy metrics displayed for different privacy rules. Selection boxes 302 may be used for selecting different privacy metrics or privacy dimensions for displaying on an electronic page 300. A selection box 302A may select a parameter or dimension for displaying on the vertical Y-axis and a selection box 302B may select a parameter or dimension for displaying along a horizontal X-axis.

For example, selection box 302A may select the vertical Y-axis to represent the average execution time required for the privacy processing system to complete execution of different privacy rules for captured web session data. Selection box 302B may select the horizontal X-axis to represent a particular time period for displaying the average execution times, such as for a particular day. FIG. 8A shows a range for the average execution time on the Y-axis of between 0.0 milliseconds (ms) and 5.0 ms and a time range on the X-axis of between 8:00 am and 3:00 pm. Of course other privacy dimensions and time ranges may be displayed on the X and Y axes.

A selection box 302C may select the privacy rules for displaying associated privacy metrics. For example, selection box 302C may select all rules #1, #2, and #3 for displaying associated average execution times. A selection box 302D may select a web session category for displaying associated security metrics. For example, selection box 302D may select privacy metrics to be displayed for captured web sessions, captured web pages within the captured web sessions, etc.

Based on the entries in selection boxes 302, the privacy processing system displays three lines 304, 306, and 308 representing changes in the average execution times over a particular day for rules #1, #2, and #3, respectively. In this example, line 304 stays relatively constant at around 4.5 ms and line 306 stays relatively constant at around 3.5 ms. Normal variations may be expected in the average execution times due to different user activities during the web sessions. For example, users may navigate though different web pages during the web sessions and may or may not complete transactions during those web sessions. Thus, different types and amounts of aggregated data may be captured for different individual web sessions that may or may not trigger the execution of certain privacy rules and may vary the amounts of time required to execute the privacy rules.

Line 308 shows a substantial change in the average execution time for rule #3 sometime after 11:00 am. Up until around 11:00 am the average execution time is around 2.5 ms and after 11:00 am the average execution time drops to around 1.0 ms. The change in the average execution time may indicate a problem with rule #3. For example, the web application may have changed a web page name or field name that was previously used for triggering rule #3. As a result, rule #3 may no longer be called for the renamed web page and personal information in the renamed web page may no longer be filtered by rule #3.

Line 308 identifies a potential filtering problem associated with rule #3. An operator may replay some of the web sessions captured after 11:00 am to determine if rule #3 is correctly filtering personal information from the captured web session data. For example, the operator may determine if rule #3 is removing a social security number from a particular web page in the replayed web session data.

FIG. 8B depicts another example of privacy metrics displayed by the privacy processing system. The operator may decide to investigate in more detail the change in the average execution time for rule #3. Either via entries in selection boxes 302 or by selecting line 308, the privacy processing system may display bar graphs showing other privacy metrics for rule #3 associated with different web pages within the web sessions. For example, the operator may select rule #3 in selection box 302C and select a web page category in selection box 302D.

In response, the privacy processing system may display different bar graphs 320, 322, and 324 each associated with a different web page that may be have been displayed during the captured web sessions. For example, bar graph 320 may be associated with a log-in page for the web session where a user logs into a web account, bar graph 322 may be associated with an accounts web page where a user enters address information, and bar graph 324 may be associated with a checkout page where the user completes a transaction for purchasing a product or service.

A first solid line bar graph may represent the average execution time for rule #3 at 11:00 am and a second dashed line bar graph may represent the average execution time for rule #3 at 12:00 pm. Bar graph 320 shows that the average execution time for privacy rule #3 for the log-in web page did not change substantially from 11:00 am and 12:00 pm and bar graph 322 shows that the average execution time for privacy rule #3 for the accounts web page did not change substantially from 11:00 am to 12:00 pm. However, bar graph 324 shows that the average execution time for rule #3 when applied to the checkout web page substantially decreased from around 2.5 ms at 11:00 am to around 0.5 ms at 12:00 pm.

The operator may use the replay system or may use other search software to then determine if rule #3 is correctly filtering personal information captured by the checkout web page. For example, by replaying some of the web sessions captured after 12:00 pm, the operator may determine that rule #3 is not filtering credit card numbers from the captured web session data. This would provide an early warning to a breach of privacy.

Figure 9A:
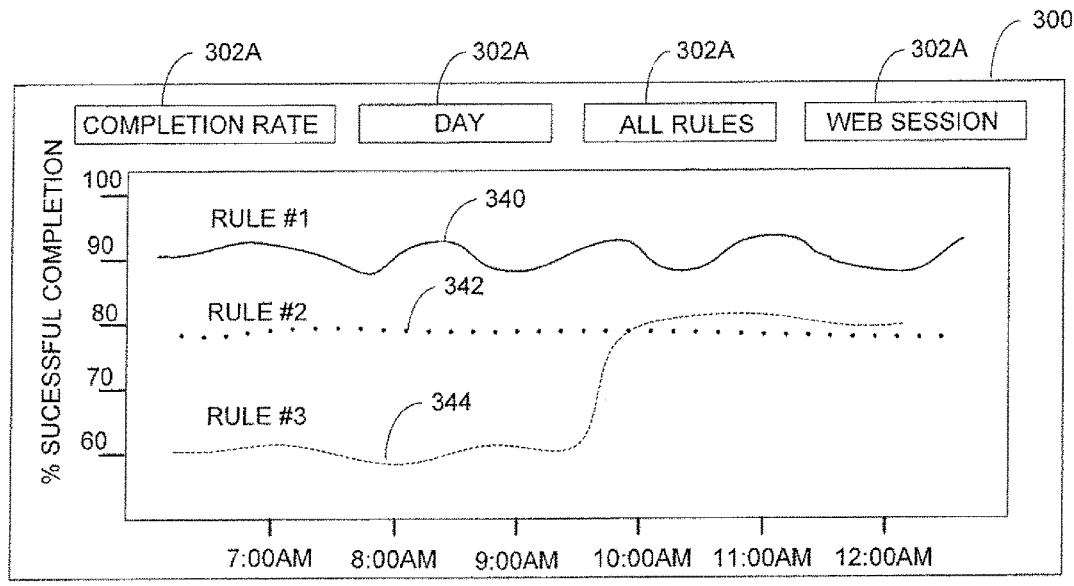
FIGS. 9A and 9B depict example graphs displaying percentage of successful completions for privacy rules.
Figure 9B:
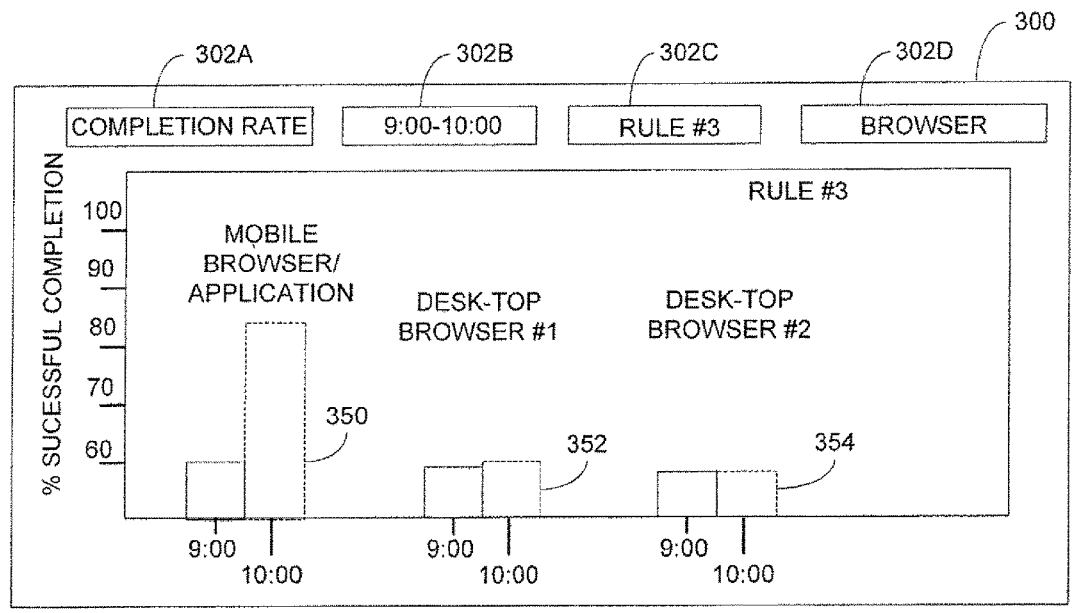

FIGS. 9A and 9B depict another example of how the privacy processing system may display privacy metrics that identify irregularities in the privacy filtering process. In this example, selection box 302A selects the vertical Y-axis to represent the successful completion rate for different rules. As explained above, the percentage completion rate may indicate the percentage of times a particular rule was called or triggered and then successfully completed an associated action, such as replacing or encrypting a sequence of numbers.

FIG. 9A shows successful completion percentages between 60% and 100%. Selection box 302B selects the time period for displaying the successful completion rates between 7:00 am and 1:00 pm. Selection box 302C selects all rules #1, #2, and #3 for displaying associated completion rates and selection box 302D selects web sessions as the category of web session data for displaying associated completion rates.

Based on the entries in selection boxes 302, the privacy processing system displays three lines 340, 342, and 344 showing the changes over a particular day for the completion rates for rules #1, #2, and #3, respectively. In this example, line 340 shows that privacy rule #1 stays relatively constant at around 90% and line 342 shows that privacy rule #2 stays relatively constant at around 80%.

Variations in the completion rate also may be expected due to the different user activities during the web sessions. Again, users may navigate though different web pages during the web sessions and may or may not complete transactions during those web sessions. For example, some users may enter credit card information into web pages during web sessions that later during privacy filtering may trigger certain privacy rules and allow the triggered privacy rules to complete associated actions. Users in other web sessions may never enter credit card numbers into web pages and thus prevent some privacy rules from completing their associated actions.

Line 344 shows a substantial increase in the completion rate for privacy rule #3 sometime between 9:00 am and 10:00 am. Up until around 9:30 am the completion rate for privacy rule #3 is around 60% and after 10:00 am the completion rate for rule #3 increases to over 80%. The increase in the completion rate may indicate a problem with privacy rule #3. For example, modifications to a web page may cause rule #3 to unintentionally replace all of the data entered into the web page. As a result, privacy rule #3 may remove web session data needed for properly replaying and analyzing captured web sessions.

Thus, line 344 identifies a potential filtering problem associated with privacy rule #3. The operator may again replay some web sessions captured after 10:00 am to determine if rule #3 is filtering the correct information from the captured web session data.

FIG. 9B depicts other privacy metrics displayed by the privacy processing system. The operator may decide to investigate the change in the completion rate for privacy rule #3. Either via entries in selection boxes 302 or by selecting line 344, the privacy processing system may display bar graphs showing security metrics for different web browsers used during the web sessions. For example, the operator may select privacy rule #3 in selection box 302C and select browsers in selection box 302D.

In response, the privacy processing system may display different bar graphs 350, 352, and 354 each associated with a different web browser or web application that may have been used during the captured web sessions. For example, bar graph 350 may be associated with a mobile web browser or mobile application used on mobile devices, bar graph 352 may be associated with a desk-top web browser used on a personal computer, and bar graph 354 may be associated with a second type of desk-top web browser used on personal computers.

A first solid line bar graph may represent the completion rates for privacy rule #3 at 9:00 am and a second dashed line bar graph may represent the completion rates for privacy rule #3 at 12:00 pm. Bar graphs 352 and 354 show that the completion rates associated with the two desktop browsers did not change substantially between 9:00 am and 10:00 pm. This may indicate that the web sessions conducted with the two desk top browsers and the privacy filtering associated with the browsers are both operating normally. However, bar graph 350 shows that the completion rate for privacy rule #3 for captured web sessions associated with the mobile browser increased substantially from around 60% at 9:00 am to around 85% at 10:00 am.

The operator may again use the replay system or other software to verify privacy rule #3 is filtering the correct information in the captured web sessions. For example, replaying some of the 10:00 am mobile browser web sessions may determine privacy rule #3 is filtering the wrong data. The test algorithm may interpret rule #3 differently for data originating from a mobile web browser, causing the data to be handled differently.

FIGS. 10A-10C depict examples of how the replay system may confirm proper privacy filtering of captured web session data. FIG. 10A depicts a mobile device 370 having a screen displaying an electronic web page 374 used to enter personal information for completing a credit card transaction. In this example, a user may enter a name into a name field 372A, enter a street address into an address field 372B, enter a town and zip code into a city field 372C, and enter a credit card number into a credit card field 372D. As explained above, a monitoring system may capture and send the personal information entered into fields 372 to the privacy processing system.

FIG. 10B shows a replayed web session after the captured web session data was filtered by the privacy processing system. The web session may be replayed on computing device 160 and may replay electronic web page 374. The capture and filtering of the web session data may have happened around 9:00 am. FIG. 10B may represent a properly filtered web session where only the first eight digits of the credit card number were replaced with X.

FIG. 10C shows a second replayed web session after the captured web session data was filtered by the privacy processing system. The filtering of the captured web session data may have happened around 10:00 am. FIG. 10C may represent incorrectly filtered web session data where all of the information captured in electronic web page 374 is replaced with X's. Thus, the replay system can be used to further investigate and identify privacy filtering problems that may have originally been identified by comparing privacy metrics with the privacy profiles.

Hardware and Software

Figure 11:
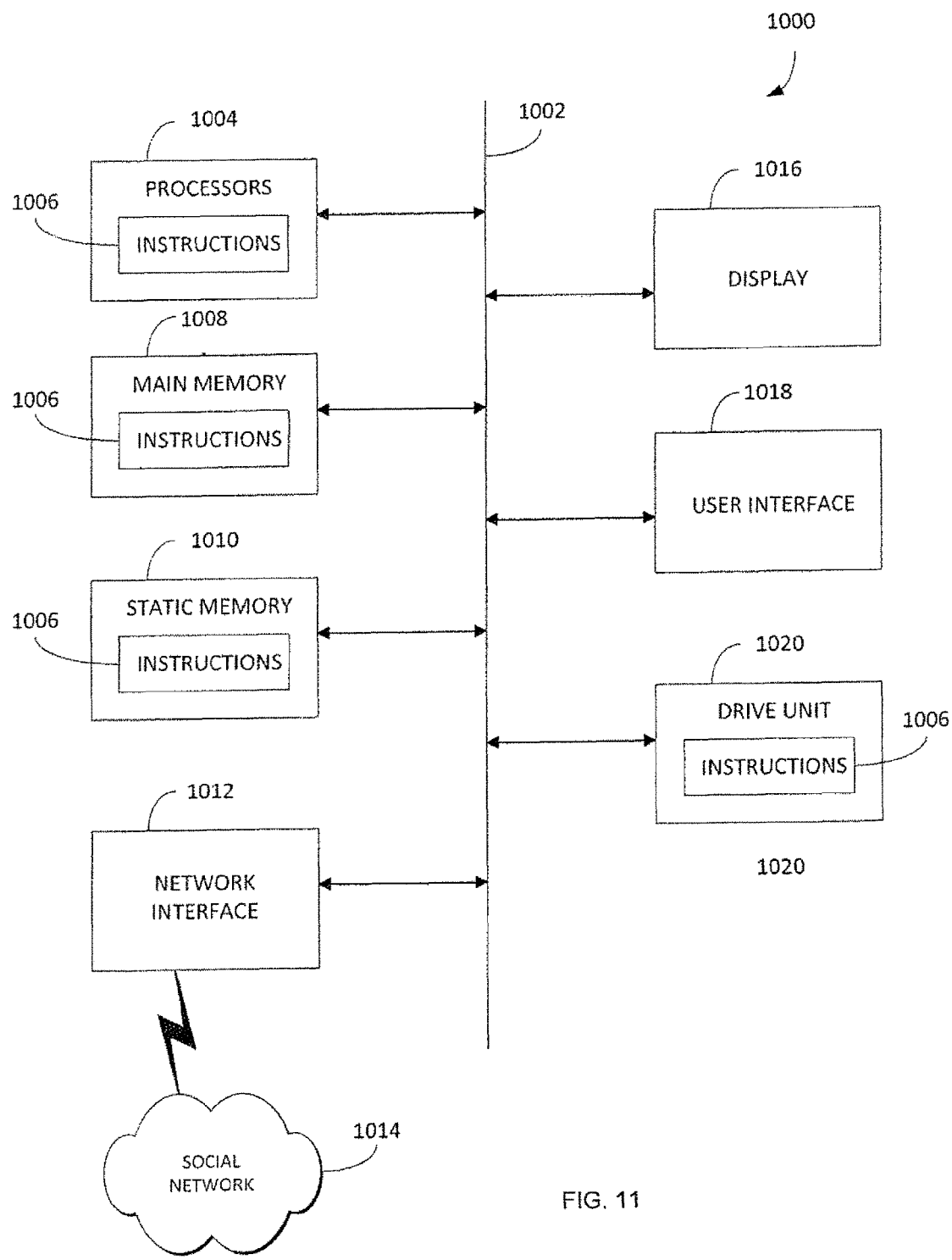
FIG. 11 depicts an example computing device for implementing the privacy processing system.

FIG. 11 shows a computing device 1000 that may be used for operating the privacy processing system and performing any combination of the privacy processing operations discussed above. The computing device 1000 may operate in the capacity of a server or a client machine in a server-client network environment, or as a peer machine in a peer-to-peer (or distributed) network environment. In other examples, computing device 1000 may be a personal computer (PC), a tablet, a Personal Digital Assistant (PDA), a cellular telephone, a smart phone, a web appliance, or any other machine or device capable of executing instructions 1006 (sequential or otherwise) that specify actions to be taken by that machine.

While only a single computing device 1000 is shown, the computing device 1000 may include any collection of devices or circuitry that individually or jointly execute a set (or multiple sets) of instructions to perform any one or more of the operations discussed above. Computing device 1000 may be part of an integrated control system or system manager, or may be provided as a portable electronic device configured to interface with a networked system either locally or remotely via wireless transmission.

Processors 1004 may comprise a central processing unit (CPU), a graphics processing unit (GPU), programmable logic devices, dedicated processor systems, micro controllers, or microprocessors that may perform some or all of the operations described above. Processors 1004 may also include, but may not be limited to, an analog processor, a digital processor, a microprocessor, multi-core processor, processor array, network processor, etc.

Some of the operations described above may be implemented in software and other operations may be implemented in hardware. One or more of the operations, processes, or methods described herein may be performed by an apparatus, device, or system similar to those as described herein and with reference to the illustrated figures.

Processors 1004 may execute instructions or "code" 1006 stored in any one of memories 1008, 1010, or 1020. The memories may store data as well. Instructions 1006 and data can also be transmitted or received over a network 1014 via a network interface device 1012 utilizing any one of a number of well-known transfer protocols.

Memories 1008, 1010, and 1020 may be integrated together with processing device 1000, for example RAM or FLASH memory disposed within an integrated circuit microprocessor or the like. In other examples, the memory may comprise an independent device, such as an external disk drive, storage array, or any other storage devices used in database systems. The memory and processing devices may be operatively coupled together, or in communication with each other, for example by an I/O port, network connection, etc. such that the processing device may read a file stored on the memory.

Some memory may be "read only" by design (ROM) by virtue of permission settings, or not. Other examples of memory may include, but may be not limited to, WORM, EPROM, EEPROM, FLASH, etc. which may be implemented in solid state semiconductor devices. Other memories may comprise moving parts, such a conventional rotating disk drive. All such memories may be "machine-readable" in that they may be readable by a processing device.

"Computer-readable storage medium" (or alternatively, "machine-readable storage medium") may include all of the foregoing types of memory, as well as new technologies that may arise in the future, as long as they may be capable of storing digital information in the nature of a computer program or other data, at least temporarily, in such a manner that the stored information may be "read" by an appropriate processing device. The term "computer-readable" may not be limited to the historical usage of "computer" to imply a complete mainframe, mini-computer, desktop, wireless device, or even a laptop computer. Rather, "computer-readable" may comprise storage medium that may be readable by a processor, processing device, or any computing system. Such media may be any available media that may be locally and/or remotely accessible by a computer or processor, and may include volatile and non-volatile media, and removable and non-removable media.

Computing device 1000 can further include a video display 1016, such as a liquid crystal display (LCD) or a cathode ray tube (CRT)) and a user interface 1018, such as a keyboard, mouse, touch screen, etc. All of the components of computing device 1000 may be connected together via a bus 1002 and/or network.

For the sake of convenience, operations may be described as various interconnected or coupled functional blocks or diagrams. However, there may be cases where these functional blocks or diagrams may be equivalently aggregated into a single logic device, program or operation with unclear boundaries.

Having described and illustrated the principles of a preferred embodiment, it should be apparent that the embodiments may be modified in arrangement and detail without departing from such principles. Claim is made to all modifications and variation coming within the spirit and scope of the following claims.

The invention claimed is:

1. A method, comprising:
generating, by a processing device, privacy metrics associated with filtering information from web session data;
generating, by the processing device, a privacy profile from the privacy metrics, wherein generating the privacy profile comprises:
identifying rules used for filtering the information from the web session data; identifying the privacy metrics associated with the rules;
periodically aggregating together the privacy metrics associated with the rules over an aggregation period; and
generating averages for the privacy metrics aggregated together over the aggregation period; and
using, by the processing device, the privacy profile to identify irregularities with the filtering of the information from the web session data;
wherein generating the privacy metrics comprises identifying a number of times the rules are called while filtering the information or a percentage of times the rules filter the information from the web session data.

2. The method of claim 1, wherein filtering the information from the web session data comprises applying the rules to the web session data.

3. The method of claim 2, wherein generating the privacy metrics consists of identifying a number of times the rules are called while filtering the information.

4. The method of claim 2, wherein generating the privacy metrics consists of identifying a percentage of times the rules filter the information from the web session data.

5. The method of claim 2, wherein generating the privacy metrics comprises identifying processing times required to complete the rules.

6. The method of claim 1, further comprising:
identifying a threshold for the privacy profile; and
generating a notice when privacy metrics associated with additional filtering of information exceed the threshold.

7. The method of claim 6, wherein the threshold comprises a standard deviation of the privacy profile.

8. The method of claim 1, wherein the information comprises at least one of:
a social security number;
a password;
a credit card number;
medical information; or
bank account information.

9. The method of claim 1, further comprising identifying the privacy metrics associated with individual web sessions.

10. The method of claim 1, further comprising identifying the privacy metrics associated with individual web pages of web sessions.

11. The method of claim 1, further comprising identifying the privacy metrics associated with different web browsers used in web sessions generating the web session data.

12. The method of claim 1, further comprising:
identifying a first Document Object Model (DOM) in the web session data associated with the identified irregularities;
identifying a second DOM in the web session data not having irregularities with the filtering; and identifying differences between the first DOM with the second DOM.

13. An apparatus, comprising:
a processor; and
a memory, wherein the memory stores executable instructions, which when executed by the processor, cause the processor to
apply privacy rules to web session data, wherein the privacy rules comprise tests and actions;
identify statistics for the privacy rules applied to the web session data wherein the statistics identify a number of times the tests are called and a number of times the actions are applied to the web session data, or amounts of time required by the processing device to apply the privacy rules to the web session data;
use the statistics to generate privacy profiles for the privacy rules, wherein the privacy profiles indicate expected operational characteristics of the privacy rules; and
identify applications of the privacy rules having operational characteristics that deviate from the expected operational characteristics indicated by the privacy profiles.

14. The apparatus of claim 13 wherein the privacy rules are configured to remove personal information from the web session data.

15. The apparatus of claim 13, wherein: the statistics identify a number of times the tests are called and a number of times the actions are applied to the web session data.

16. The apparatus of claim 13, wherein the statistics identify amounts of time required by the processing device to apply the privacy rules to the web session data.

17. The apparatus of claim 13, wherein the executable instructions, which when executed by the processor, further cause the processor to:
identify web sessions and web pages where the privacy rules are applied in the web session data; and
generate the statistics for the web sessions and web pages.

18. The apparatus of claim 13, wherein the executable instructions, which when executed by the processor further cause the processor to:
identify web browsers associated with the web session data; and
generate the statistics for the web browsers.

19. The apparatus of claim 13, wherein the executable instructions, which when executed by the processor further cause the processor to identify thresholds for the privacy profiles, wherein the identified applications have operational characteristics that exceed the thresholds.

20. The apparatus of claim 13, wherein the executable instructions, which when executed by the processor, further cause the processor to select the privacy rules from a plurality of privacy rules for filtering private information from the web session data based on web pages included in the web session data.

21. An apparatus, comprising:
a privacy processor configured to:
receive web session data captured during web sessions;
filter, based on rules used for filtering information from the web session data, at least some personal information from the web session data;
generate privacy metrics associated with filtering the personal information from the web session data wherein generating the privacy metrics comprises identifying a number of times the rules are called while filtering the personal information or a percentage of times the rules filter the personal information from the web session data; and
generate privacy profiles from the privacy metrics, wherein generating the privacy profile comprises:
aggregating the privacy metrics over an aggregation period; and
averaging the privacy metrics to generate operational characteristics of the filtering over the aggregation period; and
a memory device configured to store the filtered web session data.

22. The apparatus of claim 21, wherein the privacy processor is further configured to apply rules that filter the personal information from the web session data.

23. The apparatus of claim 22, wherein the privacy processor is further configured to:
compare new privacy metrics for the rules applied to new web session data with the privacy profiles; and
identify the new privacy metrics that are outside of thresholds for the privacy profiles.

24. The apparatus of claim 21, wherein the privacy processor is configured to:
use the rules to filter the personal information from the web session data;
identify a number of times the rules are called while filtering the personal information;
identify the number of times the rules filter the personal information; and
identify an amount of time required by the privacy processor to execute the rules.

* * * * *